July 22, 1941.    R. J. PIPER    2,250,081
POSTHOLE DIGGER
Filed June 10, 1940    3 Sheets-Sheet 1

Inventor
ROGER JUNE PIPER,
By Clarence A. O'Brien
Attorney

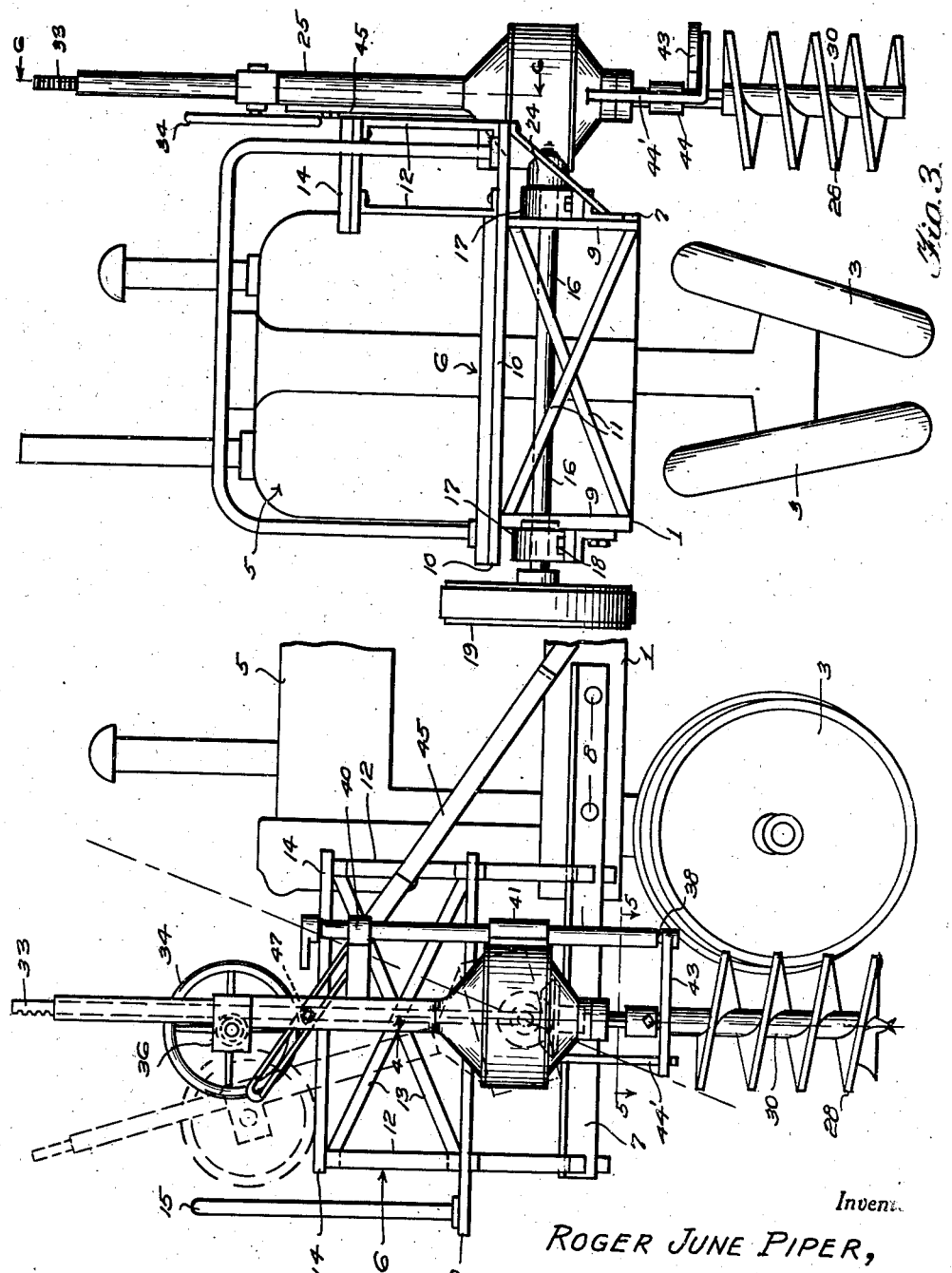

July 22, 1941.  R. J. PIPER  2,250,081
POSTHOLE DIGGER
Filed June 10, 1940   3 Sheets-Sheet 3

Inventor
ROGER JUNE PIPER

By Clarence A. O'Brien

Attorney

Patented July 22, 1941

2,250,081

UNITED STATES PATENT OFFICE 2,250,081

POSTHOLE DIGGER

Roger June Piper, Princeton, Ill.

Application June 10, 1940, Serial No. 339,780

1 Claim. (Cl. 255—19)

My invention relates to improvements in posthole diggers, and the principal object in view is to provide efficient digger apparatus of the boring type for attachment to a standard tractor and operation by the power take-off thereof, and which when not in use, may be adjusted into an out of the way position.

To the accomplishment of the above, and subordinate objects presently appearing, a preferred embodiment of my invention has been illustrated in the accompanying drawings, set forth in detail in the succeeding description, and defined in the claim appended hereto.

In said drawings:

Figure 2 is a fragmentary view in side elevation,

Figure 3 is a view in front elevation,

Figure 1:
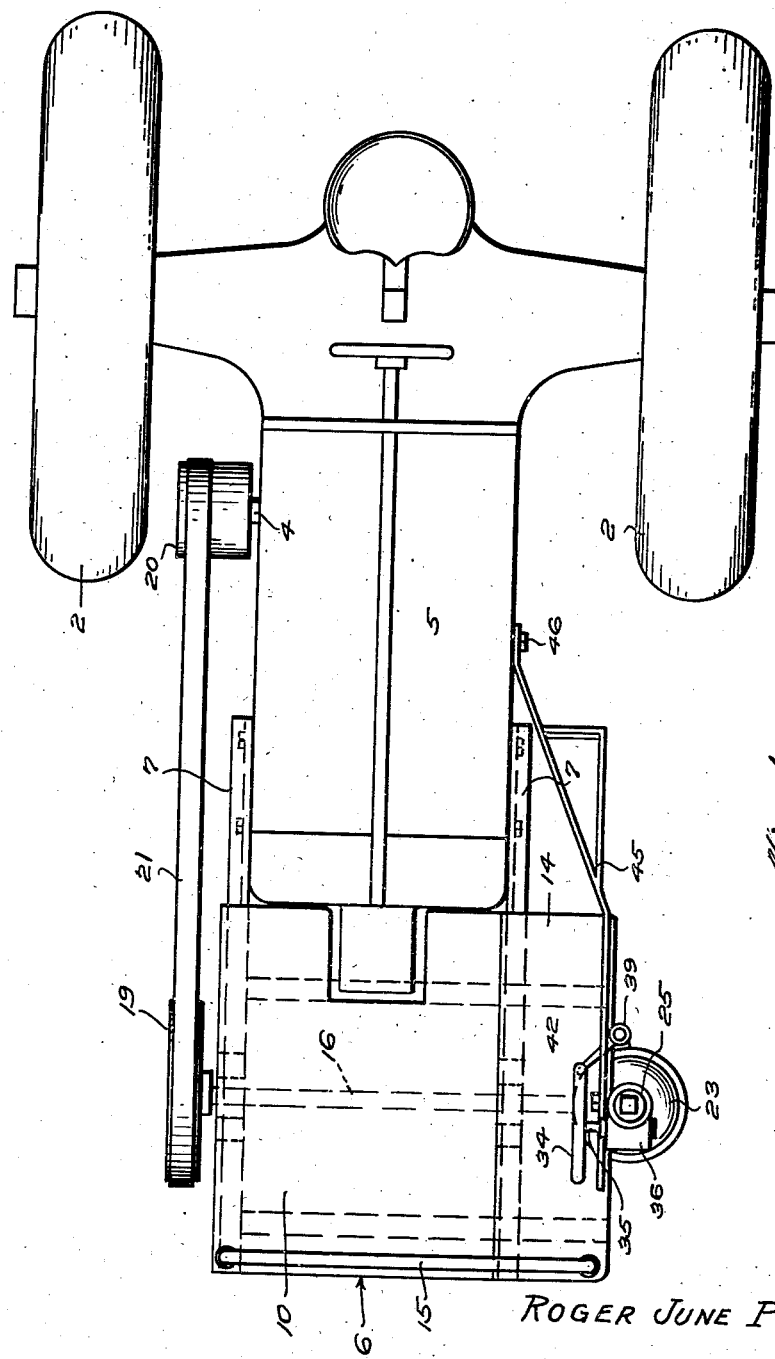
Figure 1 is a view in top plan of the preferred embodiment of my invention.
Figure 5:
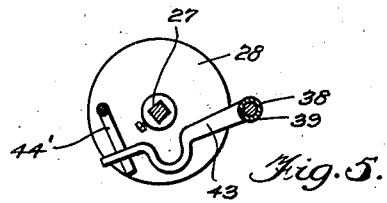
Figure 4:
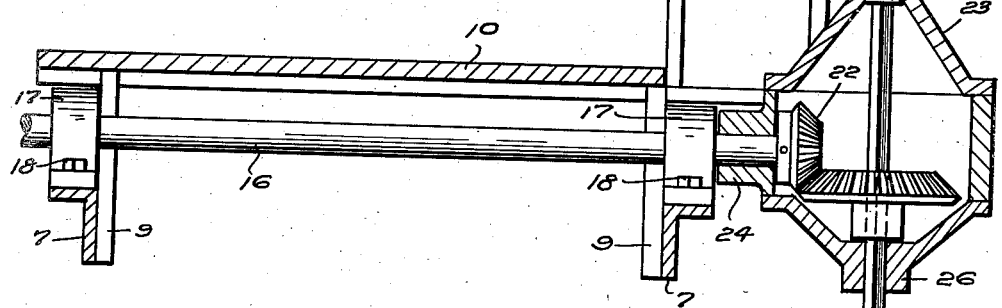
Figure 6:
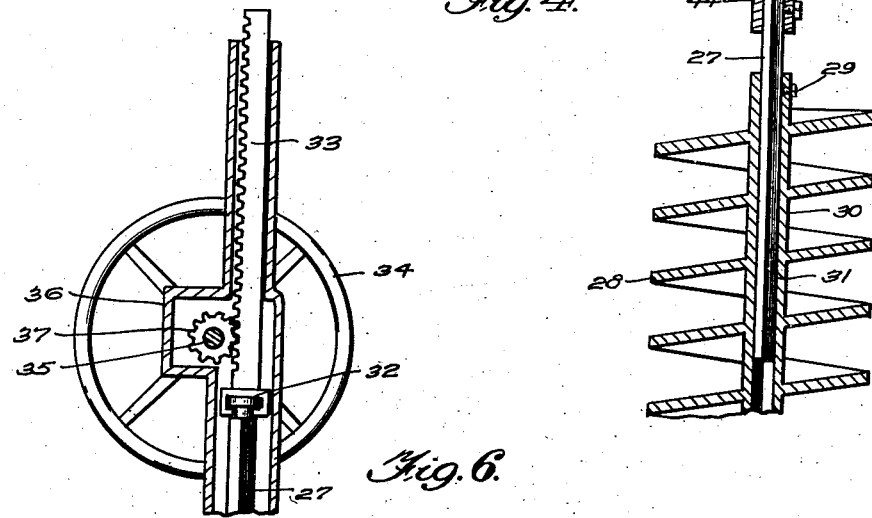

Figure 4 is a detail view in vertical section taken on the line 4—4 of Figure 2, Figure 5 is a detail view in transverse section taken on the line 5—5 of Figure 2, Figure 6 is a detail view partly in vertical section and partly in side elevation taken on the line 6—6 of Figure 3.

Referring to the drawings by numerals, I have shown my invention therein as forming part of the equipment of a standard, well-known, type of tractor conventionally illustrated, I designating the chassis, 2 the rear driving wheels, 3 the front steering wheels, and 4 the power take-off shaft adapted to be driven by the power plant represented diagrammatically and designated by numeral 5.

According to my invention, a frame structure 6 is erected on the front of the tractor comprising a pair of base side bars 7 bolted, as at 8, to the opposite sides of the chassis 2 to extend forwardly therefrom horizontally. Uprights 9 suitably secured to said bars 7 support an operator's platform 10 above said bars. The uprights 9 are suitably braced by diagonal crossed strut bars 11. The platform 10 extends laterally at preferably the left hand side of the frame structure 6 beyond the left hand side bar 7 for a purpose presently seen. Suitable uprights 12 arising from the extension support an operator's seat 14 in close proximity to digger mechanism to be described. Diagonal crossed strut bars 13 brace the uprights 12. A hand rail 15 is provided at the front edge of the platform 10 as a safety provision for the operator.

Describing now the before-mentioned digger mechanism. Intermediate the platform 10 and side bars 7 a transverse driven shaft 16 is journalled in suitable bearings 17, bolted, as at 18, to the bars 7, said shaft having a pulley 19 fast on one end thereof to which a pulley 20 fast on the power take-off shaft 4 is operatively connected by a belt 21. The other end of the shaft 16 projects out of its bearing 17 beyond the extension of platform 10 and is equipped with a beveled gear 22 fast thereon.

A gear casing 23 is swingably mounted at one side thereof on the extending end of the shaft 16 by means of a bearing 24 on said side of the casing through which said shaft extends with the gear 22 in the housing, said casing having a tubular extension 25 arising therefrom and a pair of upper and lower bearings 26, 26 in the top and bottom thereof axially aligned with said extension 25. As will be understood, the casing 23 and extension 25 constitute a unitary housing arranged to swing fore and aft of the tractor on the shaft 16.

An upright digger shaft 27, transversely square for a purpose presently seen, is journalled in the bearings 26, 26 for rotary and endwise sliding movement therein, said shaft depending from said casing 23 and extending through the same partway into the extension 25.

A rotary digger 28 of the convolute, or auger, type is sleeved onto the depending lower end of the digger shaft 27 and secured thereto by a set screw 29, said digger having a tubular core 30 with a transversely square bore therein 31 into which the digger shaft 27 fits.

The digger shaft 27 is designed to be driven by beveled gear 22 and a larger beveled gear 31 in the bottom of the casing 23 splined on said shaft by means of a square bore, not shown, therein through which said shaft is extended. The upper end of the digger shaft 27 is connected by a swivel bearing 32 to the lower end of a rack bar 33 endwise adjustable, slidably, in the upper end of the extension 25 to raise and lower said shaft and hence the digger 28. For adjusting the rack bar 33, a hand wheel 34 is provided at the same side of the extension as the seat 14 and which is fast on a horizontal stub shaft 35 journalled in and extending through a gear box 36 provided on the extension 25, said shaft 35 having a gear pinion 37 thereon in said box and meshing with the teeth of the rack bar.

Means are provided for locking the digger shaft 27 in a raised position in which the digger 28 is elevated above the ground, said means comprising a vertical rock shaft 38 journalled in a sleeve 39 secured in upright position to the extension 25 and casing 23 by a pair of upper and lower brackets 40, 41 on said extension and casing 23, respectively, said shaft having an operating crank 42 on the upper end thereof for rocking the same in opposite directions. Rocking of the shaft 29 in opposite directions swings a crank arm 43 fast on the lower end thereof into and out of supporting relation to a set collar 44 fast on the digger shaft 27 intermediate the casing 23 and digger 28. In the supporting relation of said crank arm 43, the digger shaft 27 is locked elevated, as will be clear, to prevent the digger from gravitating to the ground. A stop 44' is provided on the casing 23 for engagement by a crank arm 43 to establish the locking position of the latter.

A slotted bar 45 is pivoted, as at 46, to the left hand side of the chassis 1 to incline across the extension 25 which is provided with a set screw 47 therein extending through the slot in the bar for clamping against the latter, whereby the casing 23 and extension 25 may be swung on the shaft 16 into different set positions to correspondingly adjust the digger 28 and other parts carried thereby into different angular positions for digging at an angle to the vertical, or carrying with the digger 28 locked in raised position.

The manner in which the described posthole digger is operated will be readily understood from the foregoing.

With the digger shaft 27 unlocked and the power take-off shaft 4 operative, said shaft is driven in a manner which will now be clear to rotate the digger 28. By manipulation of the hand wheel 34, the rack bar 33 may be adjusted downwardly to feed the digger shaft correspondingly in digging, or, oppositely adjusted to withdraw the digger 28 out of the ground. The angle at which the digger 28 operates may be varied by swinging the casing 23 and extension 25 about the shaft 16, together with the digger shaft 27 and digger 28, into different set positions. When not in use, the digger shaft 27 and digger 28 may be locked in raised, disabled position in the manner and by the means previously described.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claim.

What I claim is—

In a posthole digger, a wheel supported chassis, a motor on said chassis, a frame structure at the front end of said chassis, an upright digger shaft at one side of said frame, means to mount said shaft on said frame for rotary and endwise sliding movement vertically and also for tilting movement into different angular positions, means operatively connecting said motor to said shaft to rotate the same during endwise movement thereof, means to move said shaft endwise into different set positions at will, means to lock said shaft in different angular positions, a convolute digger element fast on the lower end of said shaft and means to lock said shaft and digger against endwise movement in a downward direction.

ROGER JUNE PIPER.